(12) United States Patent
Janz

(10) Patent No.: US 6,219,193 B1
(45) Date of Patent: Apr. 17, 2001

(54) SUPERPOSITIONING MICROACTUATOR CONTROL AND WRITE CURRENT SIGNALS IN A DISC DRIVE

(75) Inventor: Donald W. Janz, Oklahoma City, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/087,221

(22) Filed: May 28, 1998

Related U.S. Application Data

(60) Provisional application No. 60/075,369, filed on Feb. 20, 1998.

(51) Int. Cl.[7] ....................................... G11B 5/02
(52) U.S. Cl. ............................. 360/55; 360/78.05
(58) Field of Search ..................... 360/61, 78.05, 360/55, 78.02; 318/568.17; 369/44.25, 44.35

(56) References Cited

U.S. PATENT DOCUMENTS

| | | |
|---|---|---|
| 5,189,578 | 2/1993 | Mori et al. . |
| 5,262,907 | 11/1993 | Duffy et al. . |
| 5,363,365 * | 11/1994 | Ajima .................................. 369/124 |
| 5,521,778 | 5/1996 | Boutaghou et al. . |
| 5,657,188 | 8/1997 | Jurgenson et al. . |
| 5,711,063 | 1/1998 | Budde et al. . |

* cited by examiner

*Primary Examiner*—Andrew L. Sniezek
(74) *Attorney, Agent, or Firm*—Crowe & Dunlevy

(57) ABSTRACT

An apparatus and method for reducing the number of interconnections in a disc drive through microactuator control and write current signal superpositioning. The disc drive includes a rotatable disc on which a plurality of tracks are defined and an actuator assembly supporting a read/write head having a write element. An actuator motor provides coarse (primary) positional control of the head and a microactuator disposed adjacent the head provides fine (secondary) positional control. A filter circuit is operably coupled between the write element and the microactuator and receives, by way of a common set of conductors, a combined signal comprising high frequency write current signals superimposed upon lower frequency microactuator control signals. The filter circuit filters the combined signal so as to pass the low frequency microactuator control signals to the microactuator and pass the high frequency write current signals to the write element.

15 Claims, 3 Drawing Sheets

SUPERPOSITIONING MICROACTUATOR CONTROL AND WRITE CURRENT SIGNALS IN A DISC DRIVE

RELATED APPLICATIONS

This application claims the benefit of Provisional Application No. 60/075,369 entitled "CONCEPT FOR IC TERMINAL WIRING REDUCTION FOR MICROACTUATORS," filed Feb. 20, 1998.

FIELD OF THE INVENTION

This invention relates generally to the field of disc drive storage devices, and more particularly, but not by way of limitation, to the superpositioning of high frequency write current signals upon low frequency microactuator control signals to reduce the number of connection paths routed along actuator arms of a disc drive which employs microactuators to provide fine positional control of heads of the disc drive.

BACKGROUND OF THE INVENTION

Disc drives are digital data storage devices which enable users of computer systems to store and retrieve large amounts of data in a fast and efficient manner. Data are magnetically stored using read/write heads which access recording surfaces of a plurality of rotatable discs.

The heads are suspended by an actuator assembly mounted adjacent the discs. The actuator assembly is pivoted about a cartridge bearing assembly by an actuator motor, typically characterized as a voice coil motor (VCM) in which a coil attached to the actuator assembly opposite the heads is immersed in a magnetic circuit comprising a pair of permanent magnets. The controlled application of current causes the coil to move relative to the magnets; as the coil moves, the actuator assembly rotates about the cartridge bearing assembly and the heads are moved across the disc surfaces.

A plurality of tracks are defined on the disc surfaces using servo information written to the discs during disc drive manufacturing. The disc drive includes a digital servo system such as disclosed in U.S. Pat. No. 5,262,907 issued Nov. 16, 1993 to Duffy et al., which applies the current to the coil in response to the servo information read by the heads in order to selectively position the heads during disc drive operation.

One commonly employed head construction is the so-called "magneto-resistive" head, which employs a thin film inductive write element to write data to the discs and a magneto-resistive (MR) read element to readback data from the discs. The MR read element is characterized as having a changed electrical resistance in the presence of a magnetic field of selected orientation, so that the selective magnetization of a track can be detected by passing a read bias current through the MR read element and detecting changes in voltage across the element. Thus, while providing improved read performance, the use of MR heads generally requires routing a first pair of conductors for the write element and a second, additional pair of conductors for the read element to each head along the actuator assembly.

A continuing trend in the industry is to provide successive generations of disc drives with ever increasing data capacities, using essentially the same available disc surface area. Accordingly, efforts continue to be made to facilitate increases in data storage areal densities, including increases in track densities. Because of limitations inherent in the use of VCMs to provide head positional control, some disc drive manufacturers are moving to implement so-called "microactuators" to facilitate further improvements in track densities. As will be recognized, microactuators are secondary motors suspended by the actuator assemblies at positions adjacent each head to provide fine (secondary) positional adjustment of each head over and above the coarse (primary) positional adjustment provided by the VCM.

A variety of microactuator constructions has been proposed in the art. One such construction involves the use of a coil such as exemplified by U.S. Pat. No. 5,657,188 issued Aug. 12, 1997 to Jurgenson et al. More particularly, this reference discloses a disc drive with a suspension having a rigid load beam and a flexure supporting a read/write head. A microactuator, disposed at a distal end of the load beam, moves the flexure about a tracking axis and includes a moving pole member mounted to the flexure, a stationary pole member mounted to the load beam, and coils disposed around the stationary pole member.

Another microactuator construction type involves the use of piezoelectric transducers such as exemplified by U.S. Pat. No. 5,521,778 issued May 28, 1996 to Boutaghou et al. and U.S. Pat. No. 5,189,578 issued Feb. 23, 1993 to Mori et al. In the U.S. Pat. No. 5,521,778 reference, an actuator assembly is mountable for pivotal movement about a pivot axis and has a coil of a primary positioning actuator motor, an actuator arm extending from the pivot axis opposite the coil, a load beam extending from the actuator arm and a microactuator between the actuator arm and the load beam. The microactuator, utilizing piezoelectric transducers arranged on a ring/hub structure, operates to provide a secondary actuator to provide fine positional control of a head disposed at a distal end of the load beam. Similarly, the U.S. Pat. No. 5,189,578 reference discloses a disc drive having an actuator assembly with a voice coil motor to provide coarse positional control and a microactuator in an arm of the actuator assembly which provides fine positional control of a head. The microactuator includes the use of a piezoelectric element and a resilient mechanism to limit deflection caused by the piezoelectric element, the resilient mechanism comprising a pair of leaf springs on each side of the piezoelectric element.

A suspension assembly formed from silicon using integrated circuit fabrication techniques and accommodating the use of a microactuator has also been disclosed in U.S. Pat. No. 5,711,063 issued Jan. 27, 1998 to Budde et al. More particularly, this reference discloses a reduced thickness magnetic head suspension disposed at a distal end of an actuator assembly, the suspension formed from an etched silicon structure and including a microactuator disposed on a load beam supporting the head. The reference further suggests forming at least a portion of the requisite electrical connection paths for the head and the microactuator using well known semiconductor etching techniques.

Although advantageously enabling disc drives to achieve higher track densities, the implementation of microactuators has its drawbacks as well, in that the use of microactuators can undesirably increase the complexity of the disc drive manufacturing process. One particular problem associated with the use of microactuators is the need to route an additional set of conductors along the actuator assembly to power the microactuator, bringing the total number of conductors to six (6) or more per head when MR heads are employed. The limited spacing available between adjacent discs, as well as the increase (by 50% or more) in the number of conductors and associated soldering connections that must be performed adds to the complexity and cost. The resulting operational reliability of the drive can also be potentially adversely affected with the introduction of these additional conductors, as loss of a single head interconnection (through latent defects or mishandling) can prevent data access and make the drive unusable.

It would be advantageous, therefore, to devise an improved approach to providing the electrical interconnections necessary to implement microactuators in a disc drive without requiring the need for routing additional conductors along the actuator arms used to support the heads.

SUMMARY OF THE INVENTION

The present invention provides an apparatus and method for reducing the number of head connection paths in a disc drive through the use of microactuator control and write current signal superpositioning.

As exemplified in a preferred embodiment, a disc drive is provided which includes a rotatable disc on which a plurality of tracks are defined and an actuator assembly supporting a read/write head having a write element. An actuator motor (such as a voice coil motor) provides coarse positional control of the head and a microactuator disposed on the actuator assembly adjacent the head provides fine positional control.

A filter circuit is further provided so as to be operably coupled between the write element and the microactuator, the filter circuit receiving, by way of a common set of conductors, a combined signal comprising high frequency write current signals superimposed upon lower frequency microactuator control signals. The filter circuit thus filters the combined signal so as to pass the low frequency microactuator control signals to the microactuator and pass the high frequency write current signals to the write element.

A combined preamp and microactuator driver circuit is used to generate and output the combined signal on the common set of conductors to the filter circuit. This advantageously reduces the number of conductive paths routed along each actuator arm used to support each head, as well as reduces the requisite number of soldering interconnections. The combined preamp and microactuator driver circuit is preferably formed on a unitary integrated circuit die.

When the disc drive is in a non-writing mode, such as during a read operation or during a seek in which a selected head is moved from an initial track to a destination track, only the low frequency microactuator control signals are transmitted along the common set of conductors.

These and various other features and advantages which characterize the present invention will be apparent from a reading of the following detailed description and a review of the associated drawings.

DETAILED DESCRIPTION

Figure 1:
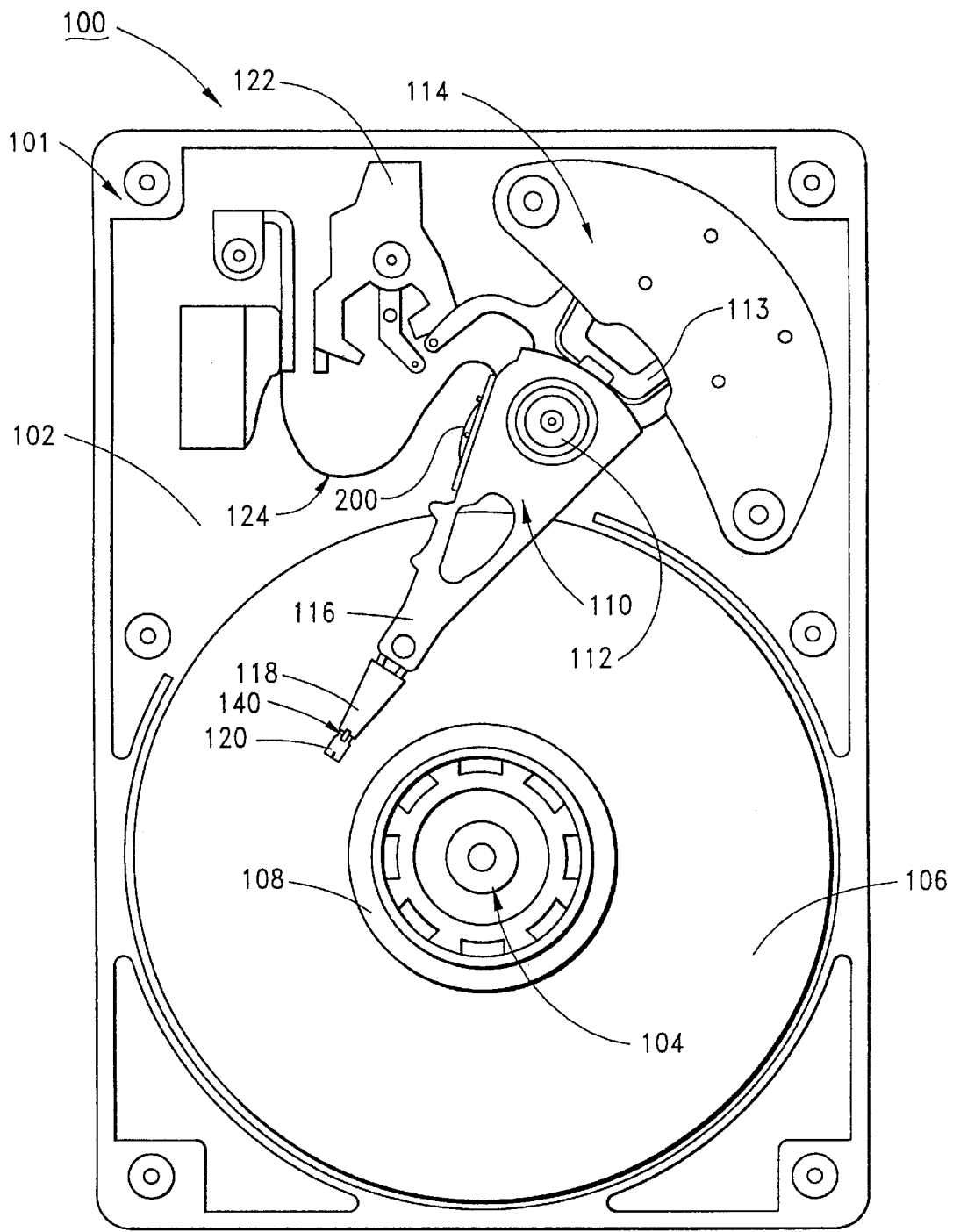
FIG. 1 shows a top plan view of a disc drive constructed in accordance with a preferred embodiment of the present invention, the disc drive incorporating the use of microactuators to provide fine positional control of heads of the disc drive.

Referring now to the drawings, FIG. 1 shows a top plan view of a disc drive 100 constructed in accordance with a preferred embodiment of the present invention. The disc drive 100 includes a head-disc assembly (HDA) 101 and a printed wiring assembly (PWA) which is mounted to the underside of the HDA, and thus not visible in FIG. 1.

A top cover, omitted from FIG. 1 to reveal interior portions of the HDA 101, mates with a base deck 102 of the HDA 101 in order to provide a clean internal environment for the HDA 101. A spindle motor (generally designated at 104) is supported by the base deck 102 and rotates a plurality of discs 106 at a constant high speed. A disc clamp 108 secures the discs 106 to the spindle motor 104.

The discs 106 include recording surfaces (not separately designated) having a plurality of tracks to which user data are written by way of a rotary actuator assembly 110. The actuator assembly 110 rotates about a cartridge bearing assembly 112 in response to the application of current to a coil (113, a portion of which is visible in FIG. 1) of a voice coil motor (VCM) 114 to provide coarse (primary) positional control of the actuator assembly. A plurality of rigid actuator arms 116 extend from the actuator assembly 110, each of which supports a corresponding flexible suspension assembly 118. A plurality of heads 120 are supported by the suspension assemblies 118 over the tracks of the discs 106 by an air bearing established by air currents set up by the high speed rotation of the discs 106. As will be discussed in greater detail below, each head 120 is preferably characterized as a magneto-resistive (MR) head and includes an associated microactuator (shown generally at 140) to provide fine (secondary) positional control of selected interactive elements of the head.

At this point it will be noted that the particular construction of the microactuator 140 is generally unimportant, as the present invention as claimed below is directed to any suitable microactuator construction that uses fine control signals to position the head 120. However, for purposes of disclosing a preferred embodiment, the microactuator 140 is contemplated as having a piezoelectric construction.

Finally, a latch assembly 122 secures the actuator assembly 110 when the disc drive 100 is deactivated and a flex circuit assembly 124 allows communication between the actuator assembly 110 and the disc drive PWA, both in a conventional manner.

Figure 2:
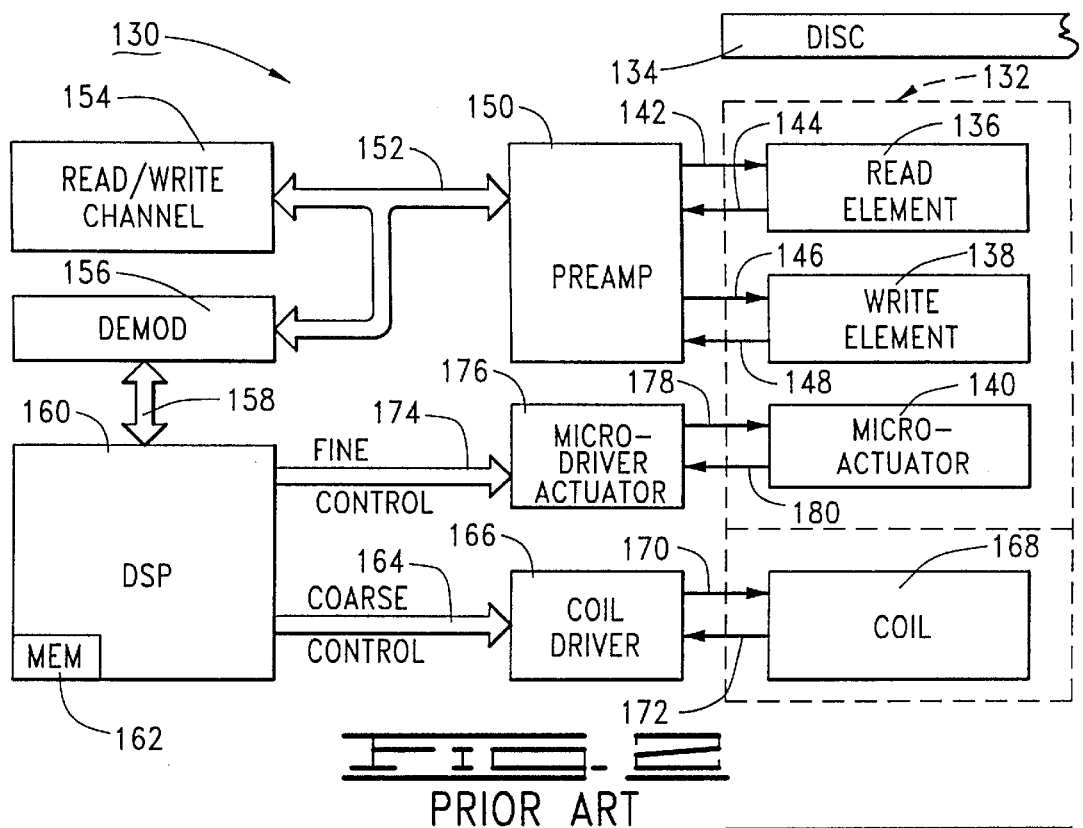
FIG. 2 provides a functional block diagram of relevant portions of a prior art disc drive that also incorporates the use of microactuators to provide fine positional control of heads of the disc drive, with FIG. 2 being provided to illustrate limitations associated with the prior art.

With reference now to FIG. 2, shown therein is a functional block diagram of relevant portions of a prior art disc drive 130 which is generally similar in construction and operation to the disc drive 100 of FIG. 1, except as discussed below. As with the disc drive 100, the disc drive 130 of FIG. 2 incorporates the use of microactuators to provide fine positional control of heads of the disc drive, with FIG. 2 being provided to illustrate limitations associated with the prior art.

As shown in FIG. 2, a head assembly (denoted by dotted enclosure 132) is controllably disposed adjacent a corresponding disc 134, with the head 132 characterized as a magneto-resistive (MR) head having an MR read element 136 and a thin film, inductive write element 138. As is typical in the prior art, the MR read element 136 comprises an alloy formed from cobalt, nickel and iron and possesses an electrical resistance that varies when subjected to a magnetic field of a selected orientation. To attain sensitivities necessary to support areal data densities of modern disc drives, each MR read element includes relatively thin boundary layers (typically measured in Angstroms) which are relatively delicate and sensitive to damage. Thus, the selective magnetization of the disc 134 can be detected during a read operation through the application of a bias current of selected magnitude and the detection of changes in voltage across the read element 136. The write element 138 has a conventional coil and write gap arrangement, as will be familiar to those skilled in the art. Data are written through the application of pulsed write currents of selected magnitude and duration to the coil to establish varying magnetic fields across the write gap in order to selectively magnetize the surface of the disc 134 in relation to the data being stored.

The head 132 is further shown in FIG. 2 to include the microactuator 140 which provides fine positional control of the read and write elements 136 and 138, as explained below. Two sets of connection paths are designated as shown at 142, 144 and 146, 148 to respectively interconnect the read element 136 and the write element 138 with a preamplifier circuit 150 (preamp). The preamp 150 is of conventional construction and operates to apply a read bias current by way of the paths 142, 144 to the read element 136 during a read operation and to apply pulsed write currents by way of the paths 146, 148 to the write element 138 during a write operation. It will be noted that arrowheads have been provided on the paths 142, 144, 146 and 148 to show the general operative connection between the read element 136, the write element 138 and the preamp 150, but such has been provided merely for convenience of illustration and may not necessarily reflect the actual signal directional flow between these components (this is also generally true for remaining signal paths discussed herein).

Continuing with FIG. 2, the preamp 150 is further shown to be operably connected (by signal path 152) to a read/write channel 154 and a servo demodulator 156 (demod). As known in the art, the read/write channel 154 encodes data to be written to the disc 134 from a host computer (not shown) and decodes data subsequently retrieved from the disc 134 for transmission to the host computer.

The demod 156 similarly conditions servo information readback from the disc 134 to facilitate servo control by a servo processor, identified in FIG. 2 as a digital signal processor 160 (DSP), which receives digital representations of the servo information from the demod 156 by way of path 158. The DSP 160 operates, in conjunction with programming stored in memory 162 (MEM) and commands received from a top level disc drive control processor (not shown), to provide coarse control signals on a path 164 to a conventional coil driver 166.

In response thereto, the coil driver 166 applies current to a coil 168 of a voice coil motor (VCM, not fully shown) by way of paths 170 and 172, thereby effecting coarse positional control of the head 132. In this regard, the disc drive 132 generally operates in a manner similar to that of the disc drive 100 of FIG. 1, so that a servo control loop is established by the read element 136, the preamp 150, the demod 156, the DSP 160, the coil driver 166 and the coil 168. The DSP 160 controls additional aspects of the operation of the disc drive 130 such as head selection, read and write bias current magnitude values, and the like, by way of suitable inputs to the preamp 150. Further, it will be noted that the purpose for enclosing the coil 168 in a dotted line enclosure adjacent the dotted line enclosure for the head 132 is to indicate the mechanical coupling of the coil 168 to the head 132, which is provided in a manner substantially similar to that set forth by the actuator assembly 110 of FIG. 1.

Continuing with FIG. 2, the DSP 160 additionally outputs fine control signals on a path 174 to a conventional microactuator driver 176. In response thereto, the microactuator driver applies current signals to the microactuator 140 by way of paths 178 and 180. In this way, the operation of the coil driver 166 and the coil 168 operates to bring the head 132 within a certain range of tracks on the disc 134 to effectuate coarse positional control, after which the microactuator driver 176 and the microactuator 140 further deflect the head 132 to a selected track from the range of tracks to effectuate fine positional control of the head 132.

From the foregoing discussion, it will be apparent that each head 132 of the prior art disc drive 130 requires a total of six conductive paths, namely paths 142 and 144 for the read element 136, paths 146 and 148 for the write element 138, and paths 178 and 180 for the microactuator 140. Typically, these conductive paths are characterized as insulated wires which are routed along the length of each actuator arm out to each corresponding head assembly. Thus, the use of the microactuator 140, while desirably accommodating a greater track density than could otherwise be achieved from the coarse control capabilities of the coil 168, nevertheless increases by a factor of 50% the number of required connection paths along each actuator arm, as well as the number of associated soldering interconnections. A typical 10 disc configuration (with 20 corresponding recording surfaces and heads) therefore results in a need for 60 separate wires to realize the prior art configuration of FIG. 2, which can undesirably add to the complexity and cost of the disc drive manufacturing process and reduce the operational reliability of the drive.

Figure 3:
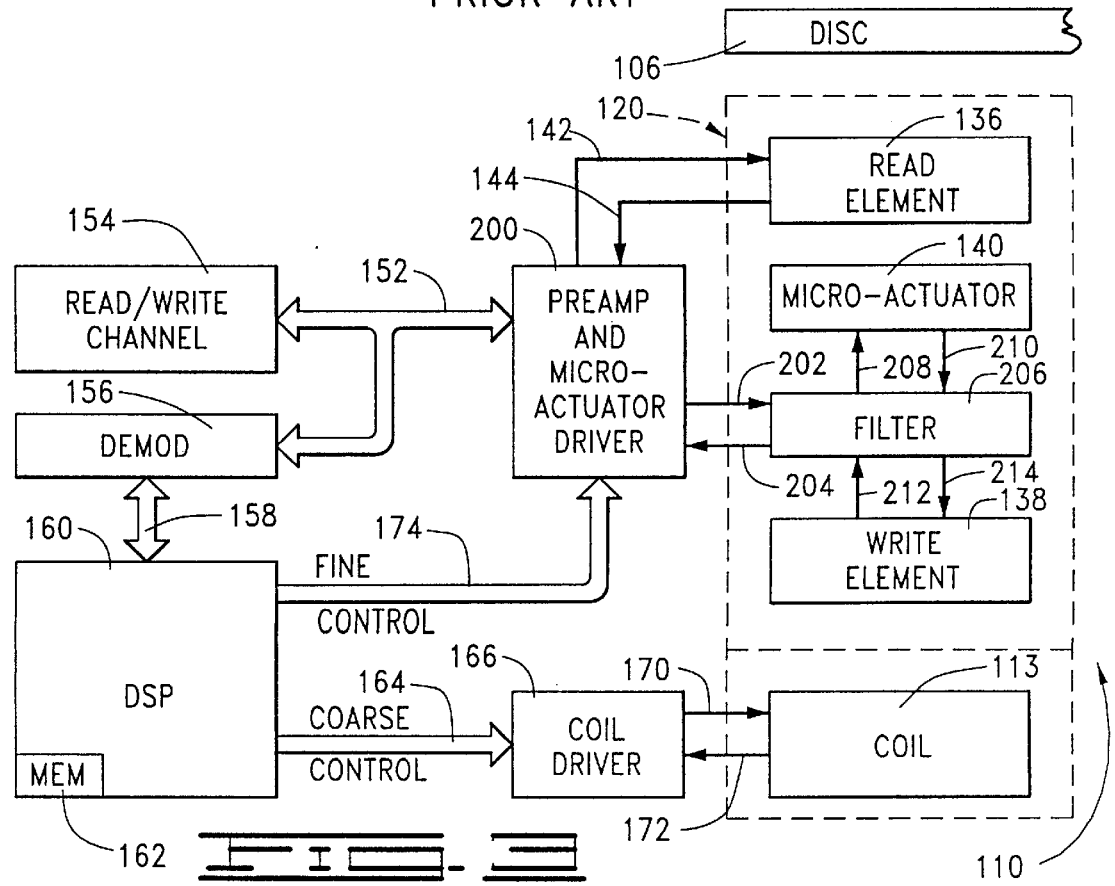
FIG. 3 provides a functional block diagram of relevant portions of the disc drive of FIG. 1, illustrating the manner in which both a microactuator and a write element of the disc drive are provided in operable communication with a preamp and microactuator driver by way of a shared, common pair of conductors and a filter circuit in accordance with a preferred embodiment of the present invention.

Accordingly, FIG. 3 has been provided which shows a functional block diagram of relevant portions of the disc drive of FIG. 1, in accordance with a preferred embodiment of the present invention. To facilitate the following discussion, reference numerals used to identify various components in FIG. 2 will also be used to identify the corresponding components in FIG. 3.

As with FIG. 2, a selected one of the heads 120 of the disc drive 100 of FIG. 1 is shown in FIG. 3 by a dotted line enclosure, forming an assembly comprising the read and write elements 136, 138 and microactuator 140 as discussed above. Unlike the prior art disc drive 130 of FIG. 2, however, FIG. 3 shows a combined preamp and microactuator driver circuit 200, operably coupled by way of a pair of conductive paths 202, 204 to a filter circuit 206, which in turn is operably coupled to the microactuator 140 by way of paths 208, 210 and to the write element by way of paths 212, 214. As explained below, the preamp and microactuator driver circuit 200 preferably incorporates the operation of both the preamp 150 and the microactuator driver 176 of FIG. 2 into a single integrated circuit to provide superimposed signals to the write element 138 and the microactuator 140 on the same signal paths 202, 204. The preamp and microactuator driver circuit 200 is preferably mounted to the actuator assembly 110, as shown in FIG. 1, to place the circuit in relatively close proximity to the heads 120. It will be noted that the preamp and microactuator driver circuit 200 provides a read bias current to the read element 136 by way of paths 142, 144, in the same general manner as previously presented in FIG. 2.

Figure 4:
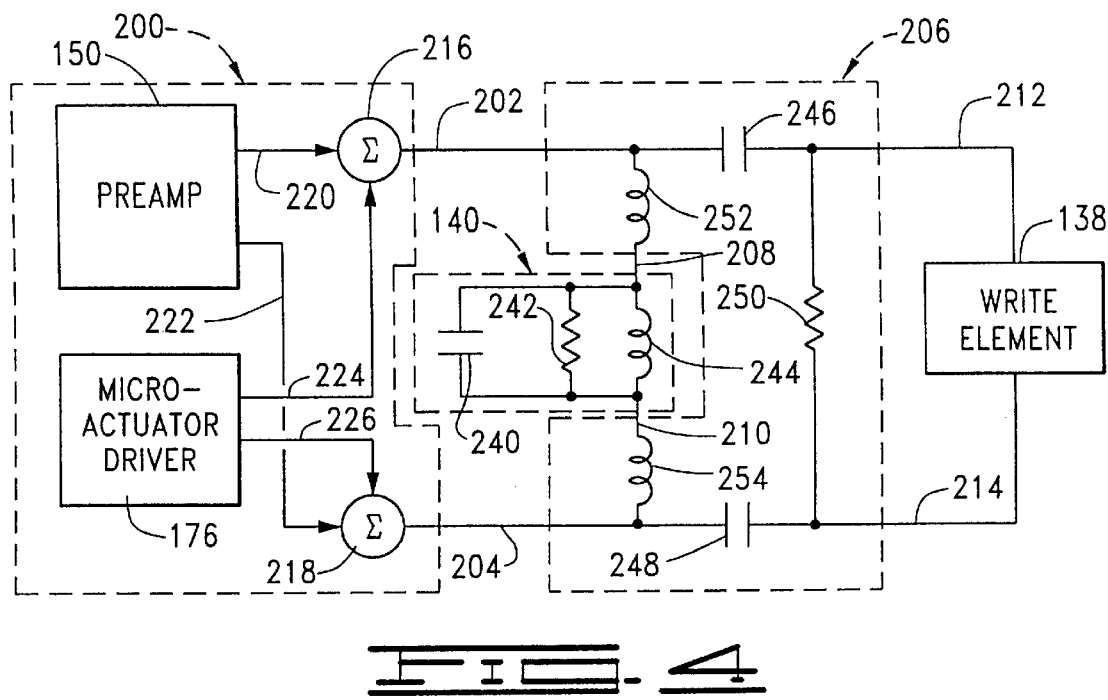
FIG. 4 provides a functional block diagram illustrating in greater detail the construction and operation of selected circuits shown in FIG. 3, including the preamp and microactuator driver, the microactuator, the write element and the filter circuit.

FIG. 4 provides a functional block diagram which illustrates in greater detail the construction and operation of the preamp and microactuator driver circuit 200, the write element 138, the microactuator 140 and the filter 206. Preferably, the preamp and microactuator driver circuit 200 substantially includes the preamp 150 and the microactuator driver 176 in a unitary die, along with summing junctions 216, 218. Thus, the control outputs of the preamp 150 and the microactuator driver 176, which are preferably characterized as differential signals provided on paths 220, 222, 224 and 226, respectively, are provided to the summing junctions 216, 218 as shown.

It will be recognized at this point that the output signals from the microactuator driver 176 (paths 224, 226) will be relatively low frequency microactuator control signals provided to maintain the selected operational portion of the head 120 (i.e., either the read element 136 or the write element 138) over the selected track, with such output signals generated as discussed above in response to the detection of servo position information on the selected track. It will be further recognized that the paths 220, 222 leading from the preamp 150 will transmit relatively high frequency write current signals during a data write operation to selectively magnetize the selected track being followed, and will generally transmit no signals at other times (such as during a seek or during a read operation, when the write element is not employed).

Figure 5:
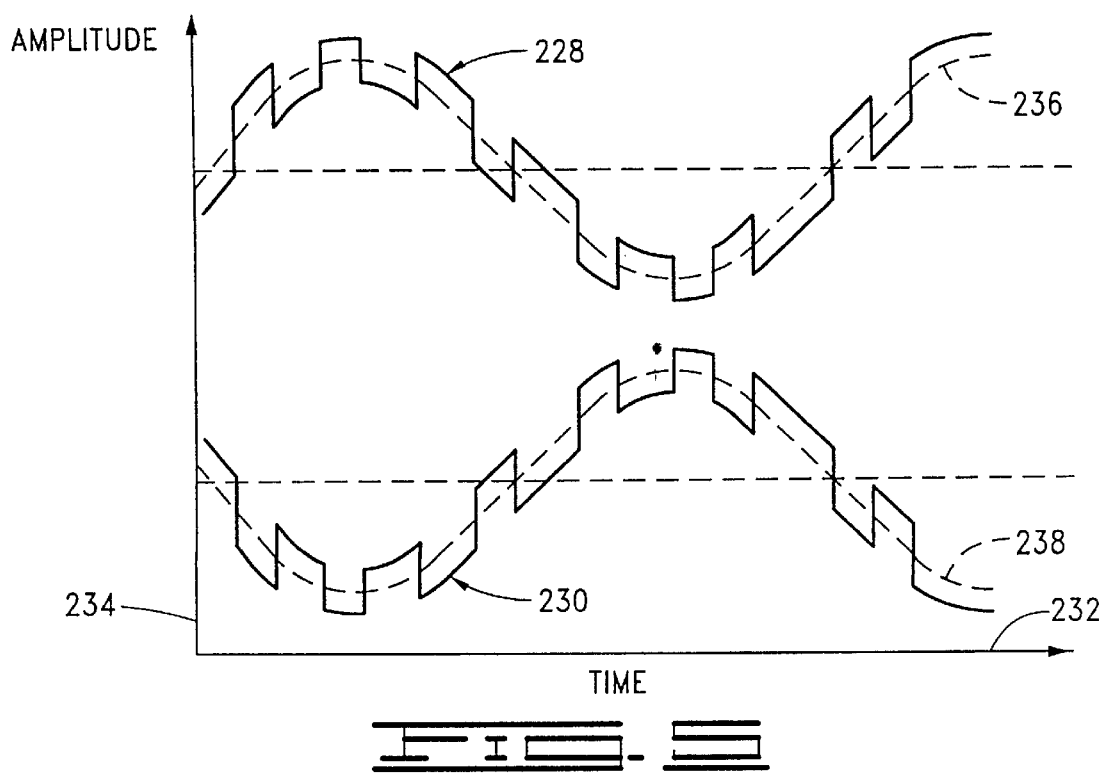
FIG. 5 is a graphical representation of a pair of differential signals provided on the shared pair of interconnection paths of FIGS. 3 and 4, showing a set of differential combined signals formed from the superposition of the relatively high frequency write current signals utilized by the write element upon the relatively low frequency microactuator control signals utilized by the microactuator.

The operation of the summing junctions 216, 218 will accordingly superimpose the high frequency write current signals upon the low frequency microactuator control signals to provide a combined signal on the connection paths 202, 204 as generally represented in FIG. 5. More particularly, FIG. 5 shows a graphical representation of a pair of differential curves 228, 230, plotted against an x-axis 232 indicative of elapsed time and a y-axis 234 indicative of amplitude. It will be noted that such superpositioning will generally only occur when both write currents and microactuator correction signals are being simultaneously provided to the head 120; otherwise, such as for example during a read operation, the output signals from the summing junctions 208, 210 on paths 202, 204 will comprise only the low frequency microactuator control signals from the microactuator driver 176 (as represented by low frequency sinusoidal components 236, 238 in FIG. 5).

Continuing with FIG. 4, the microactuator 140 is schematically represented by a capacitor 240, a resistor 242 and coil 244, connected in parallel as shown. The relative, equivalent values of each of these components will depend upon the particular construction of the microactuator 140. For example, a piezoelectric construction will be characterized as more capacitive than a coil construction, which of course will be more inductive. Hence, the diagram of FIG. 4 is suitable for any number of microactuator types, with the relative values of the capacitor 240, resistor 242 and coil 244 falling out accordingly.

The characteristics of the filter 206 are thus chosen appropriately so as to remove the low frequency components of the superimposed signals of paths 202, 204 and pass substantially only the high frequency write current signals to the write element 138. More particularly, the filter 206 is shown in FIG. 4 to comprises a pair of decoupling capacitors 246, 248 and a resistor 250 connected across the paths 202, 204. The filter 206 is further shown to preferably comprise a pair of coils 252, 254 which are connected in series with the microactuator 140. Each of coils 252, 254 has an inductance that is relatively small in comparison to the inductance of the microactuator 140. The purpose for the inclusion of the coils 252, 254 is to compensate for stray capacitance that may be associated with the microactuator 140, thereby improving the filtering characteristics of the filter 206. It will be apparent that other suitable constructions for the filter 206 can be employed, depending upon the requirements of a given application.

It will now be recognized that the present invention (as embodied herein) provides several important advantages over the prior art. By superpositioning microactuator control signals with write signals, a microactuator and a write element can be controlled using the same set of conductors routed along the corresponding actuator arm. This eliminates the requirement to add additional, separate conductors for each of these elements and reduces the number of external interconnections extending from the integrated driver circuitry.

Although the conductors have been described herein as preferably comprising insulated wires, the present invention can be readily practiced using other conductor configurations, such as etched connector paths provided along portions of the actuator assembly. Moreover, although rotary actuators employing voice coil motors (VCMs) are presently commonly employed in disc drives to effect coarse positional control, it will be recognized that advancements in the art may lead to the development or selection of other methodologies to effectuate coarse positional control, such as through a linear actuator, in combination with either rotary or linear microactuators to provide fine positional control. These and other such variations are contemplated as being readily within the spirit and scope of the invention as claimed below.

Although the microactuator 140 has been represented as being proximate, and hence considered a portion of the head 120 (as suggested in the aforementioned U.S. Pat. No. 5,657,188 reference), such is not limiting and other configurations such as the two-actuator arrangement disclosed by the aforementioned U.S. Pat. No. 5,521,778 reference could be readily adapted to incorporate the invention as claimed below.

In view of the foregoing discussion, it will now be clearly understood that the present invention provides an apparatus and method for operating a disc drive through the superpositioning of write current signals upon microactuator control signals.

As exemplified in a preferred embodiment, a disc drive (100) includes a rotatable disc (106) on which a plurality of tracks are defined and an actuator assembly (110) supporting a read/write head (120) having a write element (138). An actuator motor (114) provides coarse positional control of the head and a microactuator (140) disposed on the actuator assembly adjacent the head provides fine positional control of the head.

A common set of conductors (202, 204) electrically connects the write element and the microactuator in parallel and transmits combined signals (220, 222) comprising high frequency write current signals utilized by the write element superpositioned on lower frequency microactuator control signals utilized by the microactuator. In this manner, the same set of conductors can be used to provide signals to both the write element and the microactuator, reducing the number of required connection paths and improving the manufacturability and reliability of the disc drive.

For purposes of the appended claims, the term "microactuator" will be understood consistent with the foregoing discussion to describe a device suspended by an actuator arm to provide secondary, fine positional control of a head in addition to coarse positional control provided by an actuator motor, such as the VCM 114. Moreover, the terms "superpositioned" and "superpositioning" will be understood consistent with the foregoing discussion to describe the combination of two signals into a combined signal which is transmitted on a common path or paths, such as discussed and illustrated by FIGS. 3–5.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. In a disc drive employing the use of a microactuator to provide fine positional control of a head of the disc drive, a method for operating the disc drive, comprising steps of:
    (a) generating write current signals indicative of data to be written to a disc of the disc drive by the head;
    (b) generating microactuator control signals indicative of desired corrections in the position of the head to be carried out by the microactuator; and
    (c) superpositioning the write current signals upon the microactuator control signals to form a combination signal which is transmitted using a common conductor operably coupled to the head and to the microactuator so that the head and the microactuator simultaneously receive the respective write current signals and the microactuator control signals.

2. The method of claim 1, further comprising a step of: (d) filtering the combination signal so that substantially only the write current signals are provided to the head.

3. An actuator assembly for use in a disc drive, comprising:
    a write element which selectively magnetizes tracks defined on a rotatable disc in response to application of write current signals to the write element;
    a microactuator which provides fine positional control of the write element relative to a selected track in response to application of microactuator control signals to the microactuator;
    a filter circuit, operably connected to the write element and the microactuator; and
    a conductor, operably connected to the filter circuit, which transmits a combined signal to the filter comprising the write current signals superpositioned upon the microactuator control signals.

4. The actuator assembly of claim 3, wherein the write current signals are characterized as comprising relatively high frequency components, wherein the microactuator control signals are characterized as comprising relatively low frequency components, and wherein the filter circuit removes the relatively low frequency components from the combined signal so that substantially only the relatively high frequency components are applied to the write element.

5. The actuator assembly of claim 3, wherein the conductor is characterized as a first conductor, and wherein the actuator assembly comprises a second conductor operably connected in parallel to the filter circuit so that the combined signal is transmitted as a differential signal across the first and second conductors.

6. The actuator assembly of claim 3, further comprising a preamp and microactuator driver circuit, operably coupled to the conductor, which generates and outputs the combined signal on the conductor.

7. A disc drive, comprising:
    a rotatable disc on which a plurality of tracks are defined; and
    an actuator assembly adjacent the disc comprising:
        an actuator motor which provides coarse positional control of the actuator assembly relative to the disc;
        a head having write element which selectively magnetizes the tracks in response to write current signals applied to the write element;
        a microactuator, operably coupled to the head, which provides fine positional control of the head to selectively place the write element adjacent a selected one of the tracks in response to microactuator control signals applied to the microactuator;
        a filter circuit, operably connected to the write element and the microactuator; and
        a conductor, operably connected to the filter circuit, which transmits a combined signal to the filter comprising the write current signals superpositioned upon the microactuator control signals.

8. The disc drive of claim 7, further comprising a preamp and microactuator driver circuit, operably coupled to the conductor, which generates and outputs the combined signal on the conductor.

9. The disc drive of claim 8, wherein the conductor is characterized as a first conductor, and wherein the actuator assembly comprises a second conductor operably connected in parallel to the filter circuit so that the combined signal is transmitted as a differential signal across the first and second conductors.

10. The disc drive of claim 9, wherein the preamp and microactuator driver circuit further comprises:
    a preamp which generates the write current signals;
    a microactuator driver circuit which generates the microactuator control signals; and
    a pair of summing junctions each being operably coupled to the preamp, the microactuator driver circuit and a selected one of the first and second conductors and adding at least a portion of the write current signals and the microactuator control signals to generate the combined signal.

11. The disc drive of claim 10, wherein the preamp, the microactuator driver circuit and the summing junctions are incorporated into a single integrated circuit mounted to the actuator assembly.

12. The disc drive of claim 7, wherein the write current signals are characterized as comprising relatively high frequency components, wherein the microactuator control signals are characterized as comprising relatively low frequency components, and wherein the filter circuit removes the relatively low frequency components from the combined signal so that substantially only the relatively high frequency components are applied to the write element.

13. The disc drive of claim 7, wherein the filter circuit comprises:
- a resistor connected in parallel across the first and second conductors;
- a first capacitor connected in series with the first conductor; and
- a second capacitor connected in series with the second conductor.

14. The disc drive of claim 13, wherein the filter circuit further comprises:
- a first inductor connected in series with the microactuator and disposed between the microactuator and the first conductor; and
- a second inductor connected in series with the microactuator and disposed between the microactuator and the second conductor.

15. A disc drive, comprising:
- an actuator assembly comprising a write element and a microactuator; and
- superpositioning means, operably coupled to the write element and the microactuator, for superpositioning high frequency write current signals utilized by the write element upon low frequency microactuator control signals utilized by the microactuator.

* * * * *